United States Patent [19]

Register et al.

[11] Patent Number: 5,452,180
[45] Date of Patent: Sep. 19, 1995

[54] DOCKING APPARATUS FOR A PORTABLE DATA PROCESSING UNIT INCLUDING AN ARCUATE SUPPORT MEMBER WITH A CARD EXTENSION PIVOTALLY MOUNTED ON A BASE MEMBER

[75] Inventors: David S. Register; Clint H. O'Connor, both of Austin, Tex.

[73] Assignee: Dell USA, L.P., Austin, Tex.

[21] Appl. No.: 92,178

[22] Filed: Jul. 15, 1993

[51] Int. Cl.⁶ .......................... G06F 1/16; H05K 7/10; H05K 7/16
[52] U.S. Cl. ..................................................... 361/686
[58] Field of Search ..................... 16/223; 439/13, 164, 439/165, 326, 636, 637, 928; 364/708.1; D14/100; 361/679–686

[56] References Cited

U.S. PATENT DOCUMENTS

| D. 310,543 | 9/1990 | Brown | D14/106 X |
| D. 311,908 | 11/1990 | Molyneaux | D14/106 |
| 5,100,098 | 5/1992 | Hawkins | 364/708.1 X |
| 5,138,565 | 8/1992 | Setou | 16/223 X |
| 5,233,502 | 8/1993 | Beatty et al. | 361/681 X |
| 5,237,488 | 8/1993 | Moser et al. | 361/681 X |
| 5,264,992 | 11/1993 | Hogdahl et al. | 361/686 X |

FOREIGN PATENT DOCUMENTS

| 0530829 | 3/1993 | European Pat. Off. | G06F 1/16 |
| 94/00808 | 1/1994 | WIPO | G06F 1/16 |

Primary Examiner—Michael W. Phillips
Attorney, Agent, or Firm—Warren Kice; James Huffman

[57] ABSTRACT

An apparatus for docking a portable data processing unit is provided in which a cylindrically shaped, pivotal support member is attached to a base member for supporting the portable unit. An interface card extends from a cavity within the support member and is configured to electrically and mechanically engage within a card interface slot of the portable data processing unit. In addition to providing an electrical interface between the docking apparatus and the portable data processing unit, the interface card provides a mechanical guide for guiding the portable data processing unit into the support member and provides additional support for the portable data processing unit when engaged within the cavity of the support member. The docking unit is tiltable relative to the base member to accommodate a suitable viewing angle.

10 Claims, 2 Drawing Sheets

DOCKING APPARATUS FOR A PORTABLE DATA PROCESSING UNIT INCLUDING AN ARCUATE SUPPORT MEMBER WITH A CARD EXTENSION PIVOTALLY MOUNTED ON A BASE MEMBER

BACKGROUND OF THE INVENTION

This invention relates to a docking apparatus and, more particularly, to such an apparatus for docking a portable data processing unit to transfer data to the unit.

Portable data processing units, such as hand held laptop and notebook computers are well known and their popularity has lead to the design of even smaller units, sometimes referred to as "personal communicators" or "personal digital assistants" for specialized personal uses, such as date and name organization, note recording, and so forth.

These portable units usually contain embedded software to allow them to be independently functional. However, to receive maximum benefit from these units, it is desirable to enable the unit to access additional data from a desktop computer or other external source. To this end, and according to one prior art technique, the desktop computer has been provided with an infrared transmitter for transmitting data to a small receiver located on the portable unit. According to a second technique, a serial type cable interface has been used to connect the desktop computer directly to the portable unit. However these techniques suffer from the fact that they have a relatively low bandwidth which severely limits the data transfer rate.

Also, spatial restrictions inside the housing of the portable data processing unit have resulted in the establishment of relatively small standards for data access devices for use with a portable unit. As a result, what is generally referred to as a "computer communications card" has evolved for connecting to a corresponding socket or plug inside the portable unit for enabling multiple transmission protocols to be transmitted to the unit. For example, one set of standards for these type cards has been developed by the Personal Computer Memory Card International Association ("PCMCIA"). This type of memory card is often referred to as a "PCMCIA" card and is in the form of a wafer approximately the size of a credit card having a multiplicity of serial connectors provided at one end thereof for connection to external peripherals. However, even though these cards are relatively small, they still contribute to a crowded environment inside the housing of the portable unit and also suffer from the fact that they have a relatively low bandwidth, thus severely limiting the data transfer rate.

Since these relatively small data processing units usually have a display on their front, or face, another problem arises during docking of, and data transfer to, these units when the user wishes to view the display. This is due to the fact that these units, when docked in the prior art docking stations, often extend at an awkward angle to the user, making it difficult to view the unit from a comfortable position.

SUMMARY OF THE INVENTION

It is therefore an object of the present invention to provide a docking apparatus for docking a portable data processing unit while providing an external card for connection to the unit.

It is a further object of the present invention to provide an apparatus of the above type in which the card functions as a passive "pass through" device enabling a data source to be connected to the portable unit at a relatively high transfer rate.

It is a further object of the present invention to provide apparatus of the above type in which the card is provided as a part of the docking apparatus and is also utilized to support the docked personal computer.

It is a further object of the present invention to provide apparatus of the above type in which the docked portable computer can be tilted relative to the base member of the docking apparatus to enable the computer to be comfortably viewed.

Toward the fulfillment of these and other embodiments, the device of the present invention includes a support member rotationally mounted on a base member for supporting a data processing unit, such as a portable computer. A passive card extends from the support member for electrically and mechanically engaging the portable unit when the computer is docked to transfer data at a relatively high bandwidth to the unit. The docked unit is tiltable relative to the base member by rotating the support member.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
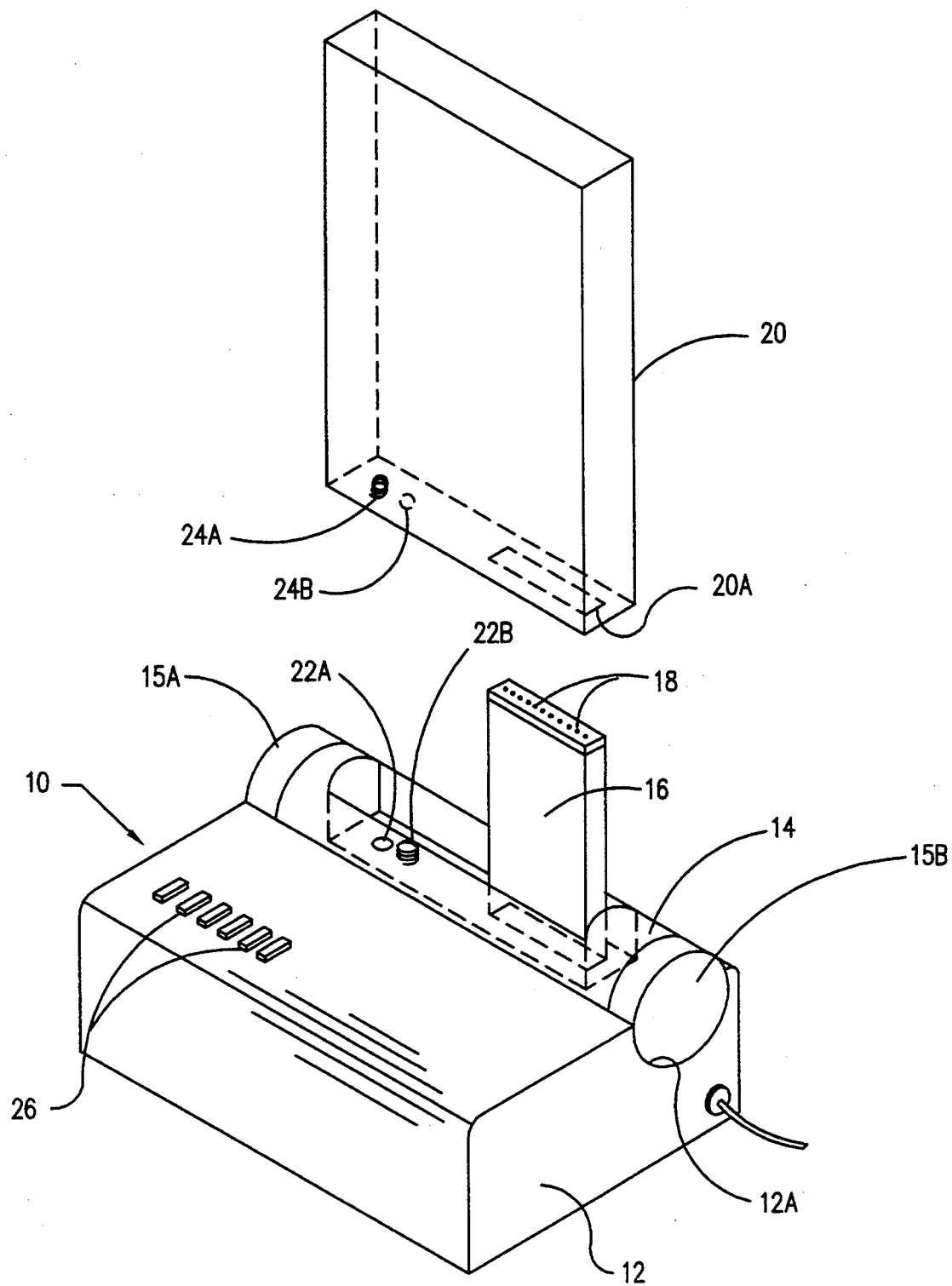
FIG. 1 is a perspective view of the docking apparatus of the present invention and a portable data processing unit which is positioned just above the docking apparatus prior to docking.

Referring specifically to the drawings, the reference numeral 10 refers, in general, to the docking apparatus of the present invention which includes a rectangular base member 12 adapted to rest on a table top, desk top, or the like. Although not clear from the drawings, it is understood that the base member 12 is connected to a source of electrical power, such as conventional alternating current, and is provided with an internal high speed data source, such as a hard drive and/or standard media connectors to connect the base member 12 to modems, disc drives and other peripherals for the high speed transfer of data, as will be described.

A horizontally extending, solid cylinder 14 is rotatably mounted in a semicircular groove 12a formed in the upper surface of the base member 12. It is understood that any type of conventional structure, can be provided to provide a resistance to rotation of the cylinder 14 to permit relatively smooth controlled rotational movement of the cylinder about its longitudinal axis relative to the base member 12. To this end the cylinder 14 extends between two fixed cylindrical end portions 15a and 15b and is connected to the end portions by torque hinges, wrap spring clutches, or the like, in a conventional manner. A cavity, or socket, 14a is provided in the upper surface of the cylinder 14 and has a height of approximately half of the diameter of the cylinder.

A passive card 16, which physically resembles a PCMCIA card, has a lower end portion which is mounted in the socket 14a of the cylinder 14. The upper portion of the card 16 projects upwardly from the upper surface of the cylinder 14. According to a preferred embodiment, the card 16 is not "active" but rather functions as a passive interconnect, i.e., to provide a high speed data connection either to a source device, such as a hard drive, disposed in the base member 12, or to an interface in the base member, which, in turn, is connected, via a multiconductor cable extending through and out from the base member 12, to an external data source such as a desktop computer, or the like. Since the hard drive, the interface and their connections to the card 16 are conventional, they are not shown in the drawings in the interest of clarity. A high density multi-socket connector 18 is provided on the upper end of the card 16, for reasons to be described.

Figure 2:
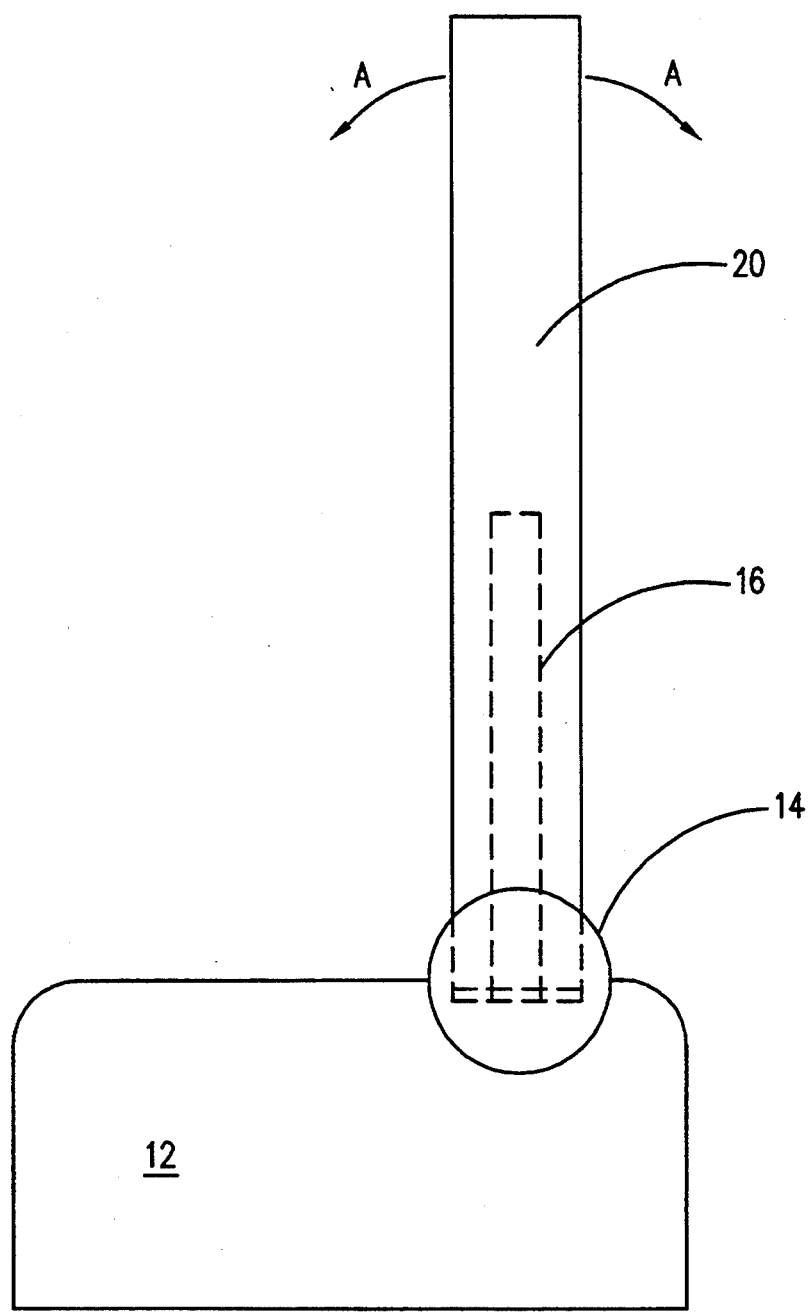
FIG. 2 is a side view of the docking apparatus and the unit of FIG. 1 depicting the unit fully docked.

A portable data processing unit, such as a relatively small personal communicator or personal digital assistor, is shown generally by the reference numeral 20 and is adapted to be docked in the socket 14a. The outer dimensions of the lower portion of the unit 20 are slightly less than the corresponding surfaces of the cylinder defining the socket 14 a so that the lower end portion of the unit fits snugly in the socket 14a in a frictional fit as shown in FIG. 2. The unit 20 has a cavity, or port, 20a formed therein and extending from its front end which port is sized to receive the card 16, also in a snug fit. It is understood that a multipin connector assembly (not shown) is provided in the unit 20 for receiving a standard computer communications, or PCMCIA, card which would be provided with a multi-socket connector to effect an electrical and mechanical connection between the unit and the card. Since these connectors are conventional they will not be described in any further detail.

A pair of electrical terminals 22a and 22b are provided in the lower portion of the surface of the cylinder 14 defining the socket 14a and are connected to a source of A.C. power through the base member 12. A pair of electrical terminals 24a and 24b are disposed on the front end of the unit 20 which are designed to engage the terminals 22a and 22b where the unit 20 is docked to transfer electrical power to the unit 20. A plurality of status lights 26 are provided on the upper surface of the base member 12 for providing visual indication of the status of the docking operation.

To dock the unit 20 on the apparatus 10, the unit 20 is placed in the position shown in FIG. 1, i.e., just above the upper end of the card 16, and then moved downwardly as viewed in the drawing until the card 16 enters the port 20a. Further downward movement of the unit 20 results in the lower-end portion of the unit entering the socket 14a. This movement continues until the lower surface of the unit 20 bottoms out on the corresponding surface of the cylinder 10 defining the bottom wall, or floor, of the socket 14. In this position the card is completely enclosed within the port 20a as shown in FIG. 2. As stated above, the lower end of the card 16 is connected to the electronics, or to the interface, of the base member 12 in any conventional manner. The multi-socket connector 18 on the upper end of the card 16 is designed to mate with the corresponding pin connector (not shown) provided in the interior of the unit 20 to electrically connect the electronics or interface in the base member 12 to the unit 20 through the card 16. Also, in the fully assembled position as shown in FIG. 3, the contacts 18a and 18b on the cylinder 14 electrically and mechanically engage the contacts 22a and 22b, respectively, on the portable unit 20 to transfer electrical power from the base member 12 to the unit 20.

After the unit 20 has been docked in the above-described manner, rotation of the support cylinder 14 about its longitudinal axis enables the unit 20 to be pivoted, or tilted, in the directions shown by the arrows A in FIG. 2 to enable its display to be comfortably viewed.

The present invention thus provides several advantages. For example, the card 16 is not permanently installed in the interior of the unit 20 while enabling the unit 20 to be connected to a high data source internal or external of the base member 12 at a high transfer rate without physical interchange of appropriate components. In addition to this, the card 16 provides a mechanical support for the unit 20 in the docked position shown in FIG. 2. Thus, the unit 20 is supported in two manners—by the engagement of its lower end portion in the socket 14a and by engagement of the card 16 in the cavity 20a of the unit. Finally, the unit 20 can be tilted relative to the base member 12 to a suitable viewing angle.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for docking a portable data processing unit, said apparatus comprising:
   a base member including a semi-circular groove formed in an upper surface thereof;
   a support member pivotally attached to said base member and including an arcuate lower surface positioned adjacent to said upper surface of said base member within said semi-circular groove, wherein said support member further includes a cavity dimensioned to accommodate insertion of a portion of an exterior housing of said portable data processing unit; and
   an interconnect member disposed within said cavity of said support member and capable of providing an electrical interface to said portable data processing unit when said portable data processing unit is inserted within said cavity of said support member.

2. The apparatus of claim 1 wherein said interconnect member includes an interface card which extends from said cavity of said support member and which is configured to extend in a corresponding port of said portable data processing unit when said portable data processing unit is inserted within cavity of said support member.

3. The apparatus of claim 1 wherein said support member is rotatably mounted on said base member to permit said portable data processing unit to be pivoted relative to said base member when said portable data processing unit is inserted within said cavity.

4. The apparatus of claim 1 wherein said support member is cylindrically shaped with said cavity formed therein and is rotatable within said semi-circular groove of said base member.

5. The apparatus of claim 1 wherein said cavity defines a plurality of inner surfaces constructed and arranged to receive said portable data processing unit in a friction fit.

6. The apparatus of claim 1 further comprising a power terminal disposed on said support member for engaging a corresponding power terminal of said portable data processing unit when said portable data processing unit is inserted within said cavity, wherein said power terminal is for transferring electrical power from said base member to said portable data processing unit.

7. Apparatus for docking a portable data processing unit, said apparatus comprising:

a base member including a semi-circular groove formed in an upper surface thereof;

a support member pivotally attached to said base member and including a cavity dimensioned to accommodate insertion of a portion of an exterior housing of said portable data processing unit, wherein said cavity defines a plurality of inner surfaces constructed and arranged to receive said portable data processing unit in a friction fit wherein said support member includes an arcuate lower surface positioned along said semi-circular groove of said base member; and an interface card disposed within said cavity and including a portion which extends beyond said cavity of said support member, wherein said interface card is dimensioned to protrude within a corresponding port of said portable data processing unit to thereby provide an electrical interface to said portable data processing unit when said portable data processing unit is inserted within said support member.

8. The apparatus of claim 7 wherein said support member is rotatably mounted on said base member to permit said portable data processing unit to be pivoted relative to said base member when said portable data processing unit is inserted within said cavity.

9. The apparatus of claim 7 further comprising a power terminal disposed on said support member for engaging a corresponding power terminal of said portable data processing unit when said portable data processing unit is inserted within said cavity, wherein said power terminal is for transferring electrical power from said base member to said portable data processing unit.

10. The apparatus of claim 7 wherein said support member is cylindrically shaped with said cavity formed therein and is rotatable within said semi-circular groove of said base member.

* * * * *